United States Patent [19]

Huvers

[11] 4,221,462
[45] Sep. 9, 1980

[54] STEREOSCOPIC VIEWER FOR PANORAMIC CAMERA FILM

[75] Inventor: Marius E. Huvers, Ste-Therese, Canada

[73] Assignee: Canadair Limited, Montreal, Canada

[21] Appl. No.: 14,835

[22] Filed: Feb. 26, 1979

[51] Int. Cl.$^3$ .............................................. G02B 27/22
[52] U.S. Cl. ..................................................... 350/136
[58] Field of Search ............... 350/135, 136, 137, 138, 350/143; 354/65, 66, 94, 99

[56] References Cited

U.S. PATENT DOCUMENTS 2,866,382  12/1958  Gruner et al. ........................ 350/136

*Primary Examiner*—Jon W. Henry
*Attorney, Agent, or Firm*—A. Lebrun

[57] ABSTRACT

A stereoscopic viewer adapted to view the images of a panoramic camera film in particular without having to cut and position the image frames side by side and while also readily compensating for the variation in physical separation between points at the center and at the edge of the images frames. In one embodiment, this stereoscopic viewer comprising a base, a viewing table mounted on the base and guiding a panoramic camera film in one direction, guide rods mounted on the base, a frame slidable on the guide rods transversely of the longitudinal direction of the film, and having a cam providing compensation for the variation in physical separation, a pair of optical viewing units including each an eyepiece and an objective, the optical viewing units being bodily displaceable longitudinally and transversely with respect to the film, a link interconnecting the optical viewing units at the objective end thereof, and one optical viewing unit being in cam following engagement with the cam whereby when one objective registers with a point or feature of one image frame, the other objective is caused to register with the corresponding point or feature of the other image frame. In another embodiment, a carriage replaces the base to support the viewing table, guide rods, and frame and the eyepieces remain fixed such that the user does not have to move his head.

11 Claims, 6 Drawing Figures

STEREOSCOPIC VIEWER FOR PANORAMIC CAMERA FILM

This invention relates to a stereoscopic viewer in particular of the type adapted for panoramic camera film as produced for instance by a panoramic camera for aerial photography.

In all the stereoscopic viewers of the above type which have been known so far, the panoramic camera film has to be cut to properly position the left and the right image frames in alignment with the objectives. For instance, this is what has been done so far in relation with the standard pocket stereoscope. This cutting up of the film is obviously an undesirable operation particularly for military application where loss of time and storage requirements should be reduced to a minimum.

Another disadvantage which has so far been lived with is caused by the skew or distorsion inherent to the image frames of the panoramic camera film, as is well known in the art. There results a variation in relative physical separation between image points at the center and at the edge of the image frames. So far, this variation in the physical separation has been accounted for by shifting the left and/or the right image frames of such film until registry is attained of the same point of the two image frames with the two objectives respectively of the viewer. It is known that the physical separation between two image frames is changing as a function of the crosstrack view angle towards the ground.

It is an object of the present invention to provide a stereoscopic viewer of the above type which avoids the operation and the inconveniences of cutting the panoramic camera film into the separate image frames.

It is another object of the present invention to provide a stereoscopic viewer of the above type which is adapted to readily compensate or correct for the variation in relative physical separation between points at the center and at the edge of the images.

It is a more specific object of the present invention to provide a stereoscopic viewer of the above type which optically shifts physically fore and aft image frames of a film to stereoscopically view them virtually side by side.

It is another more specific object of the present invention to provide a stereoscopic viewer of the above type wherein scanning of the film crosstrack wise automatically compensate for the variation in relative physical separation between image points at the center and at the edges of the image frames.

The above and other objects and advantages of the present invention will be better understood with reference to the following detailed description of preferred embodiments thereof which are illustrated, by way of examples, in the accompanying drawings, in which.

Figure 1:
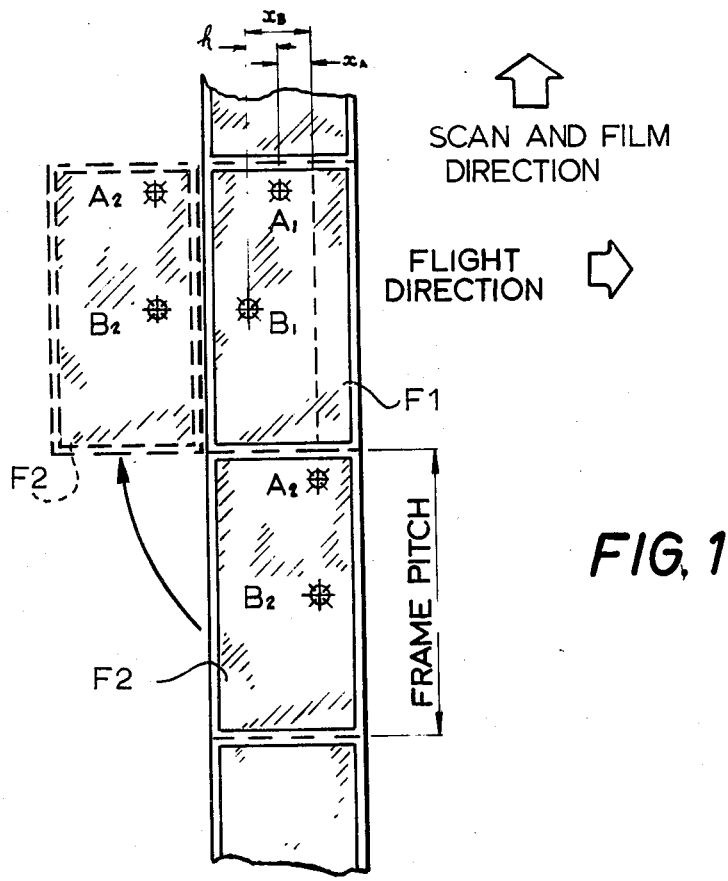
FIG. 1 is a plan view of a strip of panoramic camera film as used with the present invention.
Figure 6:
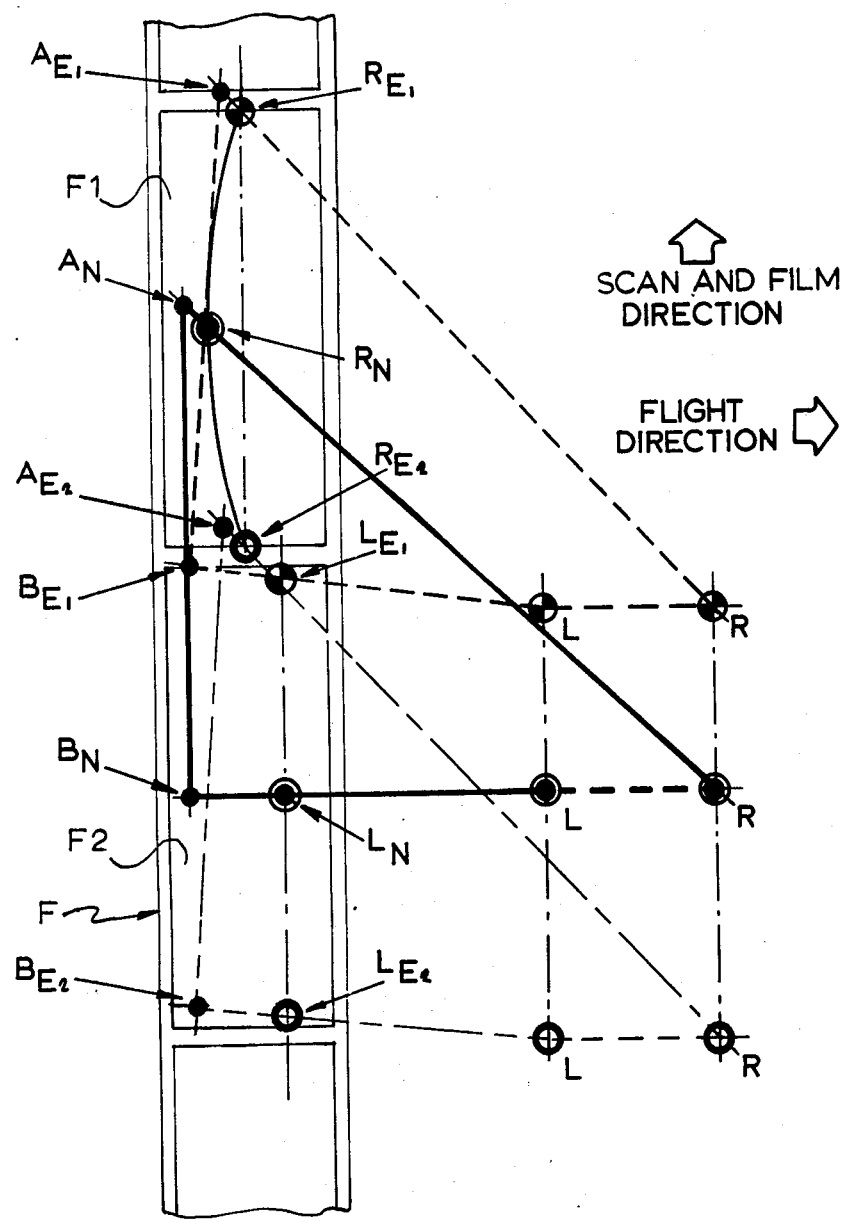
FIG. 6 is a schematic view of a stereoscopic viewer according to the present invention in three different positions longitudinally of a pair of image frames of a panoramic camera film.

The panoramic camera produces a film comprising a series of frames including the illustrated pair of successive image frames F1 and F2, as shown in FIGS. 1 and 6. As shown by the arrows in FIGS. 1 and 6, the image frames F1 and F2 are sequentially taken or shown in that order. It must be understood that the film is shown in these Figures in the same position as in the camera; that is, with the image frames optically reversed fore and aft relative to the flight direction. This explains why the image points A and B in the preceding frame F1 are forward rather than aftward in the next image frame F2.

For the prior art stereoscopic viewers, the film was cut into separate image frames such as to place the image frames F2 at the left of the image F1, as shown in dotted lines in FIG. 1. With a stereoscopic viewer of the present invention, the film remains in the form of a strip without any cutting thereof.

Figure 2:
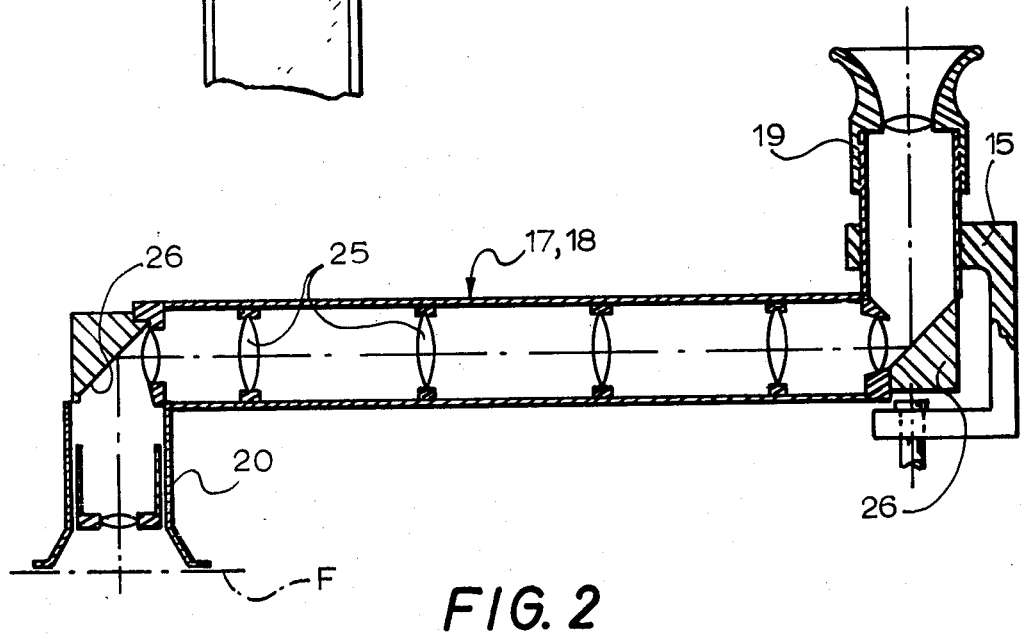
FIG. 2 is a longitudinal cross section through an optical viewing unit forming part of the present invention.
Figure 3:
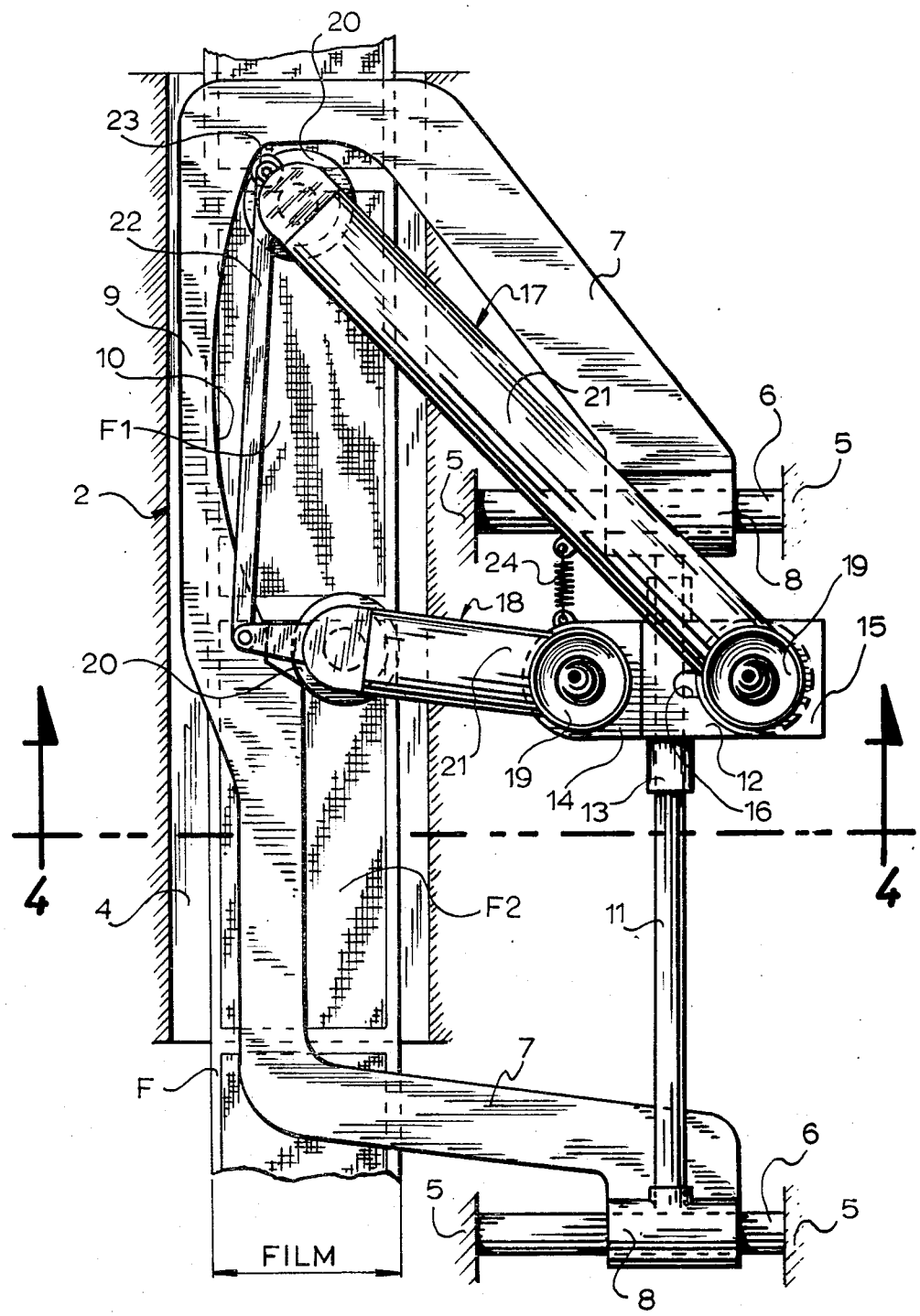
FIG. 3 is a plan view of a stereoscopic viewer according to one embodiment of the present invention.
Figure 4:
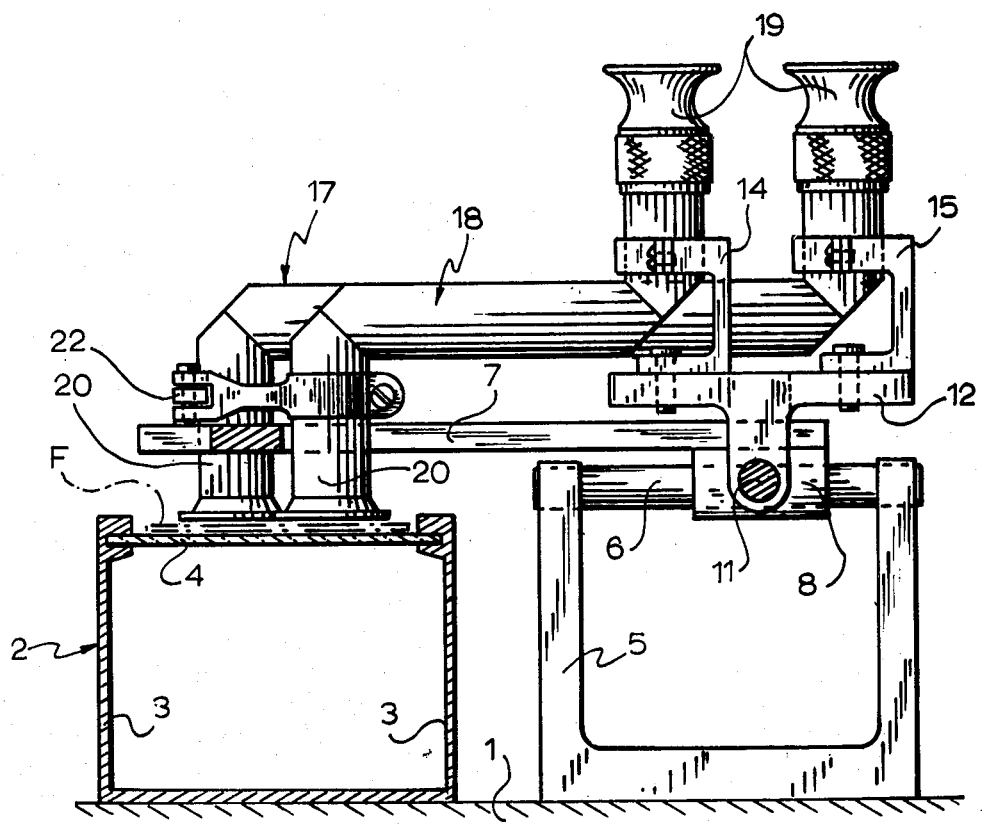
FIG. 4 is a cross-sectional view as seen along line 4—4 in FIG. 3.

The stereoscopic viewer according to the present invention and illustrated in FIGS. 2, 3, and 4 comprises a base 1 on which is fixed a viewing table 2. The latter includes an elongated box having opposite lateral sides 3 holding a translucent or transparent top 4 and cooperatively forming with the latter a guide for the film F. The latter is advanced along the film guide by any appropriate means, not shown, in one direction indicated by the arrow also indicating the scan and film direction in FIGS. 1 and 6. The viewing table 2 carries the film F such that at least the pair of image frames F1 and F2 are extended preferably flat for scanning thereof.

A pair of U shape brackets or supports 5 are secured on the base 1 and carry each a transverse guide rod 6. The two guide rods 6 extend parallel to each other and lengthwise transversely relative to the film F. A frame structure 7 is slidably connected onto the guide rods 6 by a pair of sleeve portions 8 respectively for transverse displacement relative to the film F. The frame 7 includes an intermediate portion formed or otherwise provided with a cam portion 9 whose cam surface 10 extends longitudinally of the film F. The nature and function of the cam surface 10 will be better explained later.

A longitudinal guide rod 11 is secured at its opposite ends to the sleeve portions 8 of the frame 7 and extends longitudinally of the film F. An eyepiece holder 12 is slidably mounted on the longitudinal guide rod 11 by means of its sleeve portion 13. The eyepiece holder 12 also includes a pair of brackets 14 and 15 each to operatively mount an eyepiece thereon. The bracket 14 is fixed on the base of the eyepiece holder while the bracket 15 is selectively adjustable along an adjustment slot 16 in the same base. The slot 16 extends transversely of the film F and provides for adjustment of the spacing between the eyepieces according to the spacing between the eyes of the user.

A pair of optical viewing units 17 and 18 are provided to stereoscopically view the successive image frames F1 and F2 respectively. Each frame unit includes an eyepiece 19, an objective 20, and an intermediate tube 21. The eyepieces and the objectives define parallel axes extending perpendicular to the plane of the image frames F1 and F2. The eyepieces 19 are mounted on the corresponding brackets 14 and 15 to pivot about their corresponding axis. The objectives 20 are interconnected by a link 22 which is articulated thereto to allow the pivoting of the optical viewing units about the eyepiece axes respectively. The link 22 is of predetermined length such that the spacing between the two objectives 20 longitudinally of the film F is equal to the pitch or longitudinal spacing between two successive image frames such as F1 and F2 of the film. A cam follower roller 23 is attached to the optical viewing unit 17 at the objective end thereof to operatively engage the cam surface 10. This engagement with the cam surface is obtained by means of a spring 24 attached between the optical viewing unit 17 and the eyepiece holder 12, or merely by the weight of the optical viewing unit when the whole viewer is inclined toward the user, as would be preferred to incline the eyepieces 19 at a comfortable angle for the user.

It must be noted that the objectives 20,20 are transversely offset from each other a predetermined distance which varies by an amount "h" in relation with the cam profile, from a separation of an amount $X_B$ when the feature is centrally of the image frame, at Nadir, to a separation of an amount $X_A$ when the feature is near one edge of the image frame. It is known that when the flight is in the direction of the arrow as indicated in FIGS. 1 and 6, an image point or feature A, which is at some distance laterally of the aircraft, moves slower in the film plane than a point or feature B at Nadir. Thus, the point or feature B is displaced from B1 to B2 in direct relationship with the speed and height of the aircraft while the point or feature A is displaced from A1 to A2 in relationship with the speed and height of the aircraft and with the crosstrack angle "b".

The change of separation "$h$"$=(B_1-B_2)-(A_1-A_2)=X_B-X_A$ and defines the varying distance of the profile of the cam from the tangent to the central concave point of the cam profile. The change in physical separation "h" and the cam profile are defined by the following formula $$h = w(1-a)\cdot(1-\cos b)$$

wherein "h" and "b" are as aforedescribed while "w" is the width of the images of the film and "a" is the fraction of the overlap between the two successive images.

For instance, in the case of a 70 mm film, the image width is 57 mm, with 55% overlap at nadir and a cross track angle of 70°, the value of the change of separation "h" is calculated as follows:

$$h = 57(1-0.55)(1-\cos 70°) \text{ about 17 mm.}$$

This means that in this example, the separation $B_1-B_2=57\times(1-0.55)\times\cos 0°=25.7$ mm and the separation $A_1-A_2=57\times(1-0.55)\times\cos 70°=8.7$ mm hence the change of separation "$h$"$=25.7-8.7=17.0$ mm.

The film F and the cam 9 with the precalculated profile 10 are relatively positioned to longitudinally register with the image frame F1. The objective 20 of the optical viewing unit 17 is caused to register with any image point to be viewed. By moving the frame 7 transversely along the guide rods 6, the cam surface 10 moves the cam follower roller 23 until the objective 20 registers with the chosen image point. This causes at the same time the left side objective 20 to register with the corresponding left side image point. As can be seen, the cam follower roller 23 engages one end of the cam surface 10 and induces a change of relative separation between the two objectives of a proper value to cause the objective 20 of the left side optical viewing unit 18 to register with the corresponding image point of the successive image frame F2.

In FIG. 6 the solid lines illustrate the situation where the chosen image point is on the nadir line and hence the objectives $R_N$ and $L_N$ are in the longitudinal contres of the image frames F1 and F2. The transverse separation of the objectives $R_N$ and $L_N$ are then maximum and equal to $w(1-a) \cos 0° = 25.7$ mm.

If the user wants to see an image point at the upper edge of the image frames, it is necessary to move the eyepiece holder L-R upwards to the upper dotted lines.

By moving upwards the right side optical viewing unit has to move from the solid line $R-R_N$ to the dotted line $R-R_{E1}$. The transverse separation of the objectives has then changed by an amount equal to the transverse distance between $R_N$ and $R_{E1}$. This amount is "$h$"$=w(1-a)\times(1-\cos b)$.

The lower dotted lines refer to the situation where an image point on the lower edge is chosen.

In the aforedescribed embodiment, the scanning of the image frames is produced by sliding the eyepieces 19,19 bodily with their holder along the rod 11 and by transversely moving the frame 7 with the eyepieces bodily therewith since the rod 11 is mounted on the frame 7.

It must be noted that the optical viewing units 17 and 18 may be of any appropriate construction to clearly convey the images to the eyes of the user. As shown in FIG. 2, each optical viewing unit includes any appropriate combination of lenses such as 25 and of reflectors such as 26. Each optical viewing unit can be of any other appropriate construction such as using fiber optics, provided the required image resolution is obtained.

As may be noted in FIGS. 3,4, and 6, the eyepieces 19,19 and L,R are transversely spaced apart relative to the film F while the image frames F1 and F2 are longitudinally spaced apart. Nevertheless, the optical viewing units 17 and 18 are adapted to take the image frames F1 and F2 which are one in front of the other to optically bring them virtually side by side in the eyepieces 19,19, thus avoiding the need to cut the film.

Figure 5:
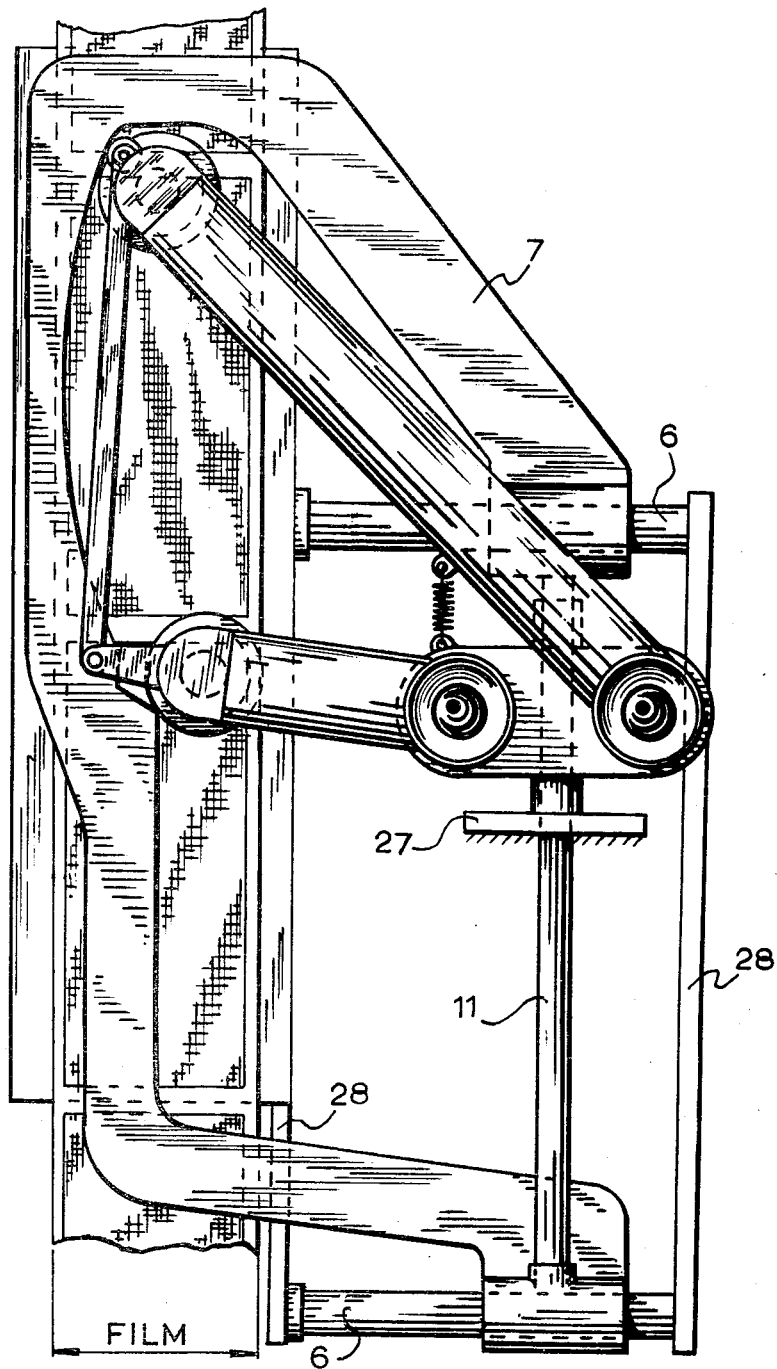
FIG. 5 is a plan view of a stereoscopic viewer according to another embodiment of the present invention.

Most advantageously, the eyepieces 19,19 and their holder 12 should be stationary to avoid having to move the head to follow the eyepieces. As shown in the second embodiment of the invention shown in FIG. 5, this is obtained by fixedly securing the eyepiece holder 12 and more particularly the sleeve portion 13 by means of a bracket 27 and by rigidly interconnecting the guide rods 6,6 and viewing table by braces or bars 28,28. There results a carriage formed by the guide rods 6,6 and the bars 28,28 which allows to bodily move all but the eyepieces, by endwise sliding of the guide rod 11 in the fixed sleeve portion 13. Transverse movement is obtained by merely sliding the frame 7 along the guide rods 6,6. One or two knobs, not shown, may be secured to the bars 28 and to the frame 7 to easily displace each with one or two hands. In such a case, the film could be advanced to the next frame by the use of a film advance member making an undirectional engagement in the film perforations. Moving such carriage in one longitudinal direction of the film would move the film with it and in the opposite direction would not move the film.

What is claimed is:

1. A stereoscopic viewer comprising a film guide holding a strip of film longitudinally extended in one direction with at least one pair of successive image frames in extended position for viewing, a pair of optical viewing units including each an eyepiece and an objective defining an eyepiece end and an objective end respectively, a holder carrying said eyepieces and constructed and arranged for displacement in said one direction relative to said strip of film bodily with said eyepieces, and a mechanical link directly interconnecting the objective ends of the optical viewing units displaceably and dependently one relative to the other, independently relative to the eyepieces and transversely relative to said one direction for interrelated displacement of the objective ends relative to each other and relative to the eyepieces transversely of said one direction, allowing scanning of the successive image frames by the objectives and change in the separation of the latter relative to each other transversely of said strip of film in relation with the position of the objective ends longitudinally of the pair of successive image frames.

2. A stereoscopic viewer as defined in claim 1, wherein said mechanical link operatively holds apart said objective ends in said direction a distance equal to the pitch between the successive image frames of said one pair.

3. A stereoscopic viewer as defined in claim 2, further including a cam member having a cam profile operatively providing the relative transverse separation relationship between said objectives.

4. A stereoscopic viewer as defined in claim 3, further comprising a frame structure including said cam member and being movably connected relative to the film guide and to the eyepiece holder, the latter being bodily displaceable with said frame structure transversely relative to the film guide, and being displaceable relative to said frame structure and said film guide in said one direction thereby allowing relative scanning displacement between the eyepieces and the pair of successive image frames both longitudinally and transversely relative to said one direction in conjunction with transverse separation between the objectives according to said transverse separation relationship.

5. A stereoscopic viewer as defined in claim 4, wherein said cam profile is defined by the formula $$h = w(1-a)\cdot(1-\cos b)$$

wherein "h" is the distance of the profile from the tangent to the central concave point thereof, "w" is the width of the image frames of the film, "a" is the fraction of the overlap between two successive image frames and "b" is the crosstrack angle of any particular point of an image.

6. A stereoscopic viewer as defined in claim 4, wherein the eyepiece and objective of each optical viewing unit have parallel optical axes extending perpendicular to the one pair of successive image frames and the optical viewing units are pivoted on said eyepiece holder about the optical axes of the eyepieces.

7. A stereoscopic viewer as defined in claim 6, wherein said eyepieces are laterally adjustable toward and away relative to each other on said eyepiece holder in relation with the eye spacing of any particular user.

8. A stereoscopic viewer as defined in claim 7, further including a base, said film guide being fixedly mounted on said base and including an illuminated viewing table, a pair of parallel guide rods fixedly secured to said base and extending lengthwise transversely to said one direction, said frame structure being slidably mounted on said parallel guide rods, a third guide rod being fixedly attached to said frame structure and extending lengthwise in said one direction, and said eyepiece holder being slidably mounted on said third guide rod and slidable thereon in said one direction relative to said frame structure and to said pair of successive image frames.

9. A stereoscopic viewer as defined in claim 8, wherein a cam follower is secured to one of said optical viewing unit adjacent the objective thereof and a spring is connected to said one optical viewing unit and operatively biases the latter into engagement of said cam follower with said cam profile.

10. A stereoscopic viewer as defined in claim 9, wherein said eyepieces are aligned substantially transversely of said one direction and said objectives are aligned substantially longitudinally relative to said one direction.

11. A stereoscopic viewer as defined in claim 7, further including a carriage, said film guide being fixedly mounted on said carriage and including an illuminated viewing table, a pair of parallel guide rods forming fixed portions of said carriage and extending lengthwise transversely to said one direction, said frame structure being slidably mounted on said parallel guide rods, said eyepiece holder being fixedly mounted, a third guide rod being fixedly attached to said frame structure, engaging said eyepiece holder slidably endwise thereon, and extending lengthwise said one direction, thereby sliding endwise in said one direction relative to said eyepiece holder and said objectives and bodily with said frame structure and said pair of successive image frames.

* * * * *